May 29, 1945.  G. EGLOFF  2,377,074
PROCESS FOR THE MANUFACTURE OF ARYL ALKENES
Filed Feb. 11, 1942
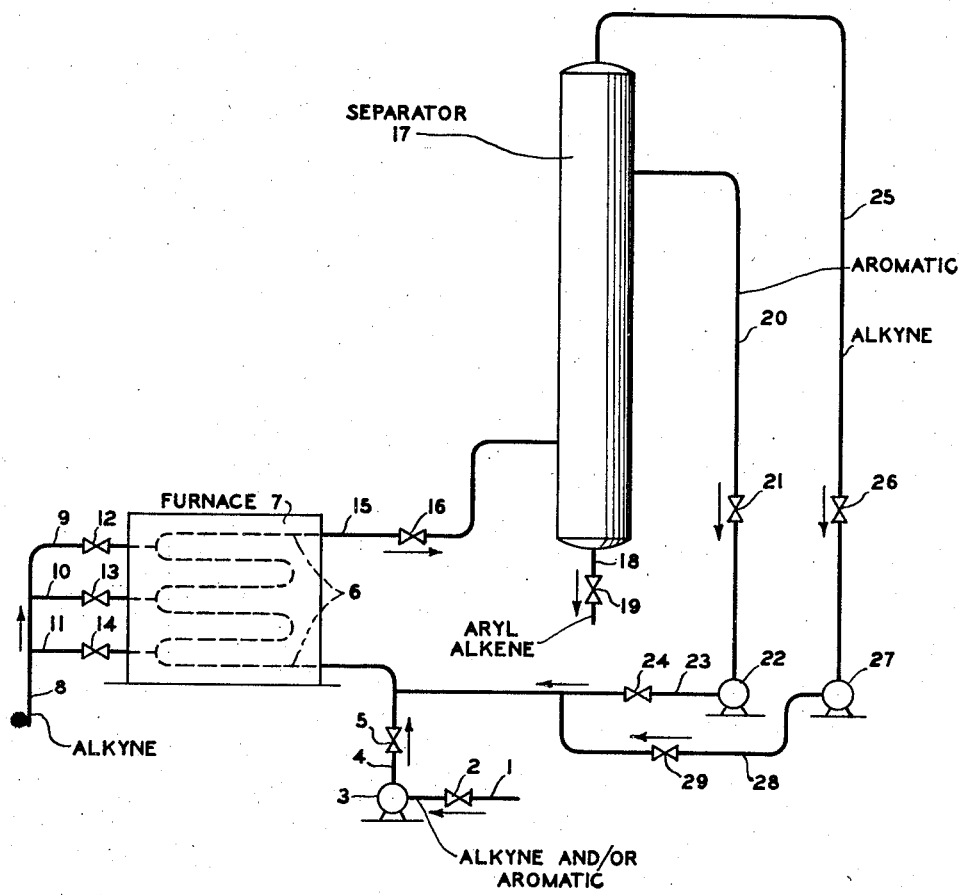
INVENTOR
GUSTAV EGLOFF
BY
ATTORNEY Patented May 29, 1945

2,377,074

UNITED STATES PATENT OFFICE 2,377,074

PROCESS FOR THE MANUFACTURE OF ARYL ALKENES

Gustav Egloff, Chicago, Ill., assignor to Universal Oil Products Company, Chicago, Ill., a corporation of Delaware Application February 11, 1942, Serial No. 430,479

6 Claims. (Cl. 260—669)

This invention relates to a process for the manufacture of aryl alkenes and more specifically to a process for the production of phenyl alkenes comprising styrene from aromatics and alkynes.

I am aware of the fact that other investigators have, with some degree of success, thermally alkylated benzene and acetylene. However, their investigations indicated that temperatures in excess of 800° C. were required to obtain any appreciable yield of styrene. As is readily apparent, temperatures of the order of those employed in the previous investigations are outside the range of practical operating temperatures. It is an object of my invention, therefore, to alkylate aromatics and alkynes at temperatures within a practical operating range.

I have found that benzene and alkynes, specifically acetylenes, may be alkylated at temperatures of about 400 to about 700° C. provided that the pressure is carefully regulated and the ratio of benzene to acetylene in the reaction mixture is carefully controlled. Another feature of my invention, therefore, is the use of pressures within the range of about 200 to 2000 pounds per square inch while maintaining the ratio of benzene to acetylene at from 5:1 to 50:1. While equal molar proportions of benzene and acetylene may be combined, it is not always possible to conduct reactions of this type with only the requisite amount of each reactant present. It is my belief that the reaction herein disclosed is one not easily stopped since styrene thus formed readily polymerizes. According to the objects of my invention styrene is formed in relatively low concentrations being diluted with benzene. This tends to retard polymerization of the styrene at elevated temperatures and makes possible its separation in a relatively pure state.

The gradual introduction of acetylene to the reacting mixture, I have discovered is a very effective and desirable method for maintaining the high ratios desired. It is, therefore, another feature of my invention to pass benzene in a restricted stream through a reactor zone and introduce acetylene to said stream at spaced points in the reactor zone, while maintaining the resulting mixture at conversion temperature and under superatmospheric pressure.

In order to illustrate my invention more clearly, reference is made to the accompanying diagrammatic drawing showing in general side elevation one form of the apparatus which may be used to accomplish the object hereinbefore set forth. It is to be understood that neither the drawing nor the description which follows are to be construed as limiting the broad scope of the invention and that I am aware of the fact that various procedural changes may be made without departing from the spirit of the invention.

Referring now to the drawing, an aromatic hydrocarbon comprising for example benzene, naphthalene or the like is introduced through line 1, containing valve 2, to pump 3. Pump 3 discharges through line 4 containing valve 5 into heating coil 6. In some instances an alkyne comprising acetylene or any one of its related compounds may be combined with the aromatic in line 1 and be introduced in combined state therewith into heating coil 6. However, as already mentioned, this is not the preferred operation, it being more desirable to introduce the alkyne at spaced points in the reaction zone. In any event the charge to heating coil 6 is heated therein to a conversion temperature of the order of 400 to about 700° C., heat being supplied by means of furnace 7. Preferably also the charge in coil 6 is maintained under a superatmospheric pressure of from about 200 to about 2000 pounds per square inch. An alkyne comprising acetylene, notwithstanding the fact that some may have been introduced with the benzene charge in line 1, is preferably supplied to the process by way of line 8 and introduced at spaced points in coil 6 by way of lines 9, 10 and 11 containing valves 12, 13 and 14 respectively. Preferably also the rate of introduction of acetylene to the mixture in coil 6 is so regulated that the molar excess of benzene to acetylene never substantially exceeds 50:1.

The resulting conversion products leaving coil 6 are conducted through line 15 containing valve 16 into separator 17. For the purpose of this description, separator 17 has been illustrated as a single zone. However, it is recognized that a series of procedural steps now well known in the art may be employed to effect the desired separation. For example, a solvent extraction step may be employed to separate unreacted acetylene from the remaining conversion products. The latter may then be fractionated at reduced pressures to separate styrene from unreacted benzene. However, since these steps form no part of the invention, the means for accomplishing the same will not be described in greater detail. The aryl alkene, comprising styrene, separated in separator 17 is removed therefrom by way of line 18 containing valve 19 and recovered as such or subjected to any desired purifying treatment. Unreacted aromatics comprising the benzene supplied to the process are removed from separator 17 by way of line 20 containing valve 21 and may be recovered by means not illustrated but are preferably returned to the reaction coil by way of pump 22, line 23, valve 24 and line 4. Similarly unreacted alkyne comprising the acetylene supplied to the process is removed from separator 17 by way of line 25, containing valve 26 and may be recovered by means not illustrated but is preferably returned to the reaction coil by way of pump 27, line 28, valve 29 and lines 23 and 4.

As an example of one specific operation of the process, benzene is introduced to a heating coil and therein heated to a temperature of 500° C. while maintaining the benzene under a pressure of 1000 pounds per square inch. Acetylene is introduced at spaced points in the heating coil at a rate such that the ratio of benzene to acetylene is maintained at approximately 30:1. Resulting reaction products are removed from the heating coil and supplied to separating means wherein styrene is separated from the unconverted materials. A conversion to styrene of approximately 20% based on the acetylene charged to the process may be obtained under the conditions above specified.

I claim as my invention:

1. A process for the production of aryl alkenes by combining an aromatic with an alkyne, which comprises maintaining the ratio of aromatic to alkyne at from 5:1 to 50:1 and reacting the mixture at a temperature of from 400 to 700° C. and at a pressure of from 200 to 2000 pounds per square inch.

2. A process for the production of phenyl alkenes by combining benzene with an alkyne, which comprises maintaining the ratio of benzene to alkyne at from 5:1 to 50:1 and reacting the mixture at a temperature of from 400 to 700° C. and at a pressure of from 200 to 2000 pounds per square inch.

3. The process of claim 2 further characterized in that said alkyne comprises acetylene.

4. A process for the production of phenyl alkenes by combining benzene with an alkyne, which comprises maintaining the ratio of benzene to alkyne at from 5:1 and 50:1, passing the resulting mixture in a restricted stream through a heating zone and therein heating the same to a temperature of from 400 to 700° C. while maintaining a pressure of from 200 to 2000 pounds per square inch.

5. A process for the production of phenyl alkenes which comprises passing benzene in a restricted stream through a reaction zone and therein heating the same to conversion temperature, introducing an alkyne to said stream at spaced points in said reaction zone whereby to maintain a ratio of benzene to alkyne not substantially in excess of 50:1 and effecting the alkylation of benzene and alkyne at superatmospheric pressure and at a temperature of from about 400° C. to about 700° C.

6. A process for the production of styrene which comprises passing benzene in a restricted stream through a heating zone and therein heating the same to conversion temperature, introducing acetylene to said stream at spaced points in said heating zone whereby to maintain a ratio of benzene to acetylene not substantially in excess of 50:1, effecting the alkylation of benzene and acetylene at superatmospheric pressure and at a temperature of from about 400° C. to about 700° C., separating from the resulting conversion products unreacted benzene and acetylene and combining the benzene and acetylene thus separated with the benzene introduced to said heating zone.

GUSTAV EGLOFF.